(12) United States Patent
Sircar (10) Patent No.: US 11,451,742 B2
(45) Date of Patent: Sep. 20, 2022

(54) SPEECH ACTIVITY DETECTION USING DUAL SENSORY BASED LEARNING

(71) Applicant: BlackBerry Limited, Waterloo (CA)

(72) Inventor: Shiladitya Sircar, Ottawa (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 17/112,637

(22) Filed: Dec. 4, 2020

(65) Prior Publication Data

US 2022/0182578 A1 Jun. 9, 2022

(51) Int. Cl.
*H04N 7/15* (2006.01)
*G10L 25/78* (2013.01)
*G06V 10/75* (2022.01)
*G06V 20/40* (2022.01)
*G06V 40/16* (2022.01)

(52) U.S. Cl.
CPC ............ *H04N 7/15* (2013.01); *G06V 10/751* (2022.01); *G06V 20/40* (2022.01); *G06V 40/165* (2022.01); *G10L 25/78* (2013.01)

(58) Field of Classification Search
CPC combination set(s) only.
See application file for complete search history.

(56) References Cited

U.S. PATENT DOCUMENTS

| | | |
|---|---|---|
| 7,081,915 B1 | 7/2006 | Hamilton |
| 9,390,729 B2 | 7/2016 | Wang |
| 2003/0198328 A1 | 10/2003 | Li |
| 2014/0098174 A1* | 4/2014 | Summers ............ G06K 9/6255 348/14.1 |
| 2015/0081550 A1* | 3/2015 | Priebatsch ............ G06Q 20/20 705/44 |
| 2015/0334344 A1* | 11/2015 | Shoemake ............ H04N 7/141 348/14.16 |
| 2016/0065898 A1* | 3/2016 | Lee ........................ H04N 7/152 348/14.09 |

FOREIGN PATENT DOCUMENTS

WO 2012128382 A1 9/2012

OTHER PUBLICATIONS

European Extended Search Report; Application No. 21212296.4; dated May 3, 2022; 8 pages.

* cited by examiner

*Primary Examiner* — Phung-Hoang J Nguyen
(74) *Attorney, Agent, or Firm* — Conley Rose, P. C.; J. Robert Brown, Jr.

(57) ABSTRACT

A dual sensory input speech detection method includes receiving, at a first time, a first video image input of a conference participant of the video conference and a first audio input of the conference participant; communicating the first video image input to the video conference; identifying the first video image input as a first facial image of the conference participant; determining, based on the first facial image, the first video image input indicates the conference participant is in a speaking state; identifying the first audio input as a first speech sound; determining, while in the speaking state, the first speech sound originates from the conference participant; and communicating the first audio input to an audio output for the video conference.

19 Claims, 4 Drawing Sheets

SPEECH ACTIVITY DETECTION USING DUAL SENSORY BASED LEARNING

BACKGROUND

Video conferencing enables participants to conduct a meeting from several physical locations at once. Participants are not required to be in the same room to hold a meeting. Participants may join a video conference using readily available communication devices. For example, participants may join the video conference using a laptop or desktop computer, a mobile device, or other smart device. The video conference functions similarly to a traditional telephone conference call with added video of each of the participants.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DESCRIPTION

Video conference calls with many participants typically result in a large amount of unwanted background noise although participants are not speaking. In some approaches, echo cancellation techniques are employed to remove double talk echo effects when participants are unmuted. In some approaches, noise suppression techniques are applied to clean the speech signal by suppressing noise from speech. Many noise suppression techniques lower the quality of the audio signal to 16 kHz (kilohertz) band thus reducing sound fidelity. Further, background noise suppression is usually a server centric process, resulting in less privacy and security for the participants in the video conference.

To reduce the effects of users leaving their microphones unmuted, a dual sensory input speech detection system is disclosed herein that is applied to the video conferencing system. Background noise suppression techniques may be applied to detect and extract speech captured by an audio capture device, such as a microphone, and spatial image recognition may be used to detect lip movement of a participant using an image capture device, such as a camera. Correlating the speech from video and speech from audio may be used to apply a dynamic microphone attenuation filter to mute or unmute a participant's microphone to avoid unwanted background noise when the participant fails to mute their microphone. As used herein, muting or unmuting a user's microphone or audio capture device describes muting or unmuting the user's audio input to the video conference. The user's microphone or audio capture device may be listening to the user, but not transmitting to the video conference in order to detect the user's speech prior to transmitting the audio to the video conference.

The dual sensory input speech detection system combines visual cues for lip movement and audio cues of human speech to control a microphone attenuation gate for a duration that is learnt through training. Based on a model developed through training, the speech detection algorithm can be enhanced and thus microphone mute/unmute/attenuation states can be controlled automatically. The approach may be used to control the microphone based on the participant's speech. Further, based on learning the participants speech, the model can be used to avoid triggering the participant's microphone in response to other people talking near the participant.

The dual sensory input speech detection system relies on audio and video monitoring. The audio may be processed to extract only the speech of the participant. The participant's speech may be extracted from babble noise or any other non-speech sounds. The video may be utilized to extract spatial lip geometry of the participant. A machine learning model with an input of lip geometry change over time mapped to the extracted speech signal may be utilized to accurately predict that the participant is talking. By combining these two signals (audio and video) the machine learning model may accurately predict the intent of the participant and thus adjust the microphone output gain. The gain function of the microphone is tuned using the machine learning model to create the dual sensory input speech detection system. In one embodiment, the microphone state is not merely mute or unmute, but a ramp function from mute to unmute or unmute to mute. Thus, a continuous smooth adjustment of microphone state (e.g., participant input volume) can be handled dynamically.

The dual sensory input speech detection system, in one embodiment, may be implemented at source of audio and video provided to the video conference (e.g., the participant's communication device). Implementing at the user's device provides increased privacy and security for the participant. The user device may be a desktop computer, mobile device, browser on a computer, mobile browser, etc. The audio may be processed in real time i.e., at 16 khz audio rate. The facial image extraction and processing may be performed at 20 frames per second (fps) on mobile and desktop devices including browsers. Other frame rates for image extraction and processing may be achieved based upon hardware and software capabilities of the communication device. In another embodiment, the dual sensory input speech detection system may be implemented at a server or other intermediary device between participants in the video conference. In yet another embodiment, the dual sensory input speech detection system may be implemented at an endpoint of the video conference (e.g., at a user device at the receiving end of the video conference). In still another embodiment, aspects of the dual sensory input speech detection system may be implemented in a distributed fashion between an intermediary device and user devices.

The combination of speech and lip/mouth state gives a high degree of certainty in predicting whether or not a participant is speaking. However, from the time mouth movement to speech is correlated, the time lag due to the prediction needs to be captured and accommodated for smooth speech in the video conference. The audio sampling rate dictates the allowable maximum latency of the prediction. For example, lip landmark identification may occur at 22 fps and speech detection may occur within 10 milliseconds (ms). Thus, the dual sensory input speech detection system can be setup to activate the participants microphone based on voice activity detection within 50 ms based on the lip landmark identification and speech detection. Once activated, a silence or pause period can be biased with voice activity detection along with dual sensory input speech detection system prediction to attenuate the microphone in steps before completely muting the participant for prolonged silence. In some embodiments, the microphone muted to unmuted or unmuted to muted step can be on a ramp function based on the intrinsic latency within 10-20 ms. The combination of voice activity detection along with dual sensory input speech detection output allows for a smooth audio signal and continuous single party conversation in a video conference.

In another implementation, the dual sensory input speech detection system may be applied to a two-factor authentication system. The first factor may be facial recognition while the second factor may be a spoken password or phrase. The dual sensory input speech detection system detects the spoken password or phrase and correlates the sound to the movement of the lips to ensure that an actual person is attempting to authenticate using the two-factor authentication system. Thus, the dual sensory input speech detection system may be configured to ensure a recording of a user's voice is not used with a still photograph.

Figure 1A:
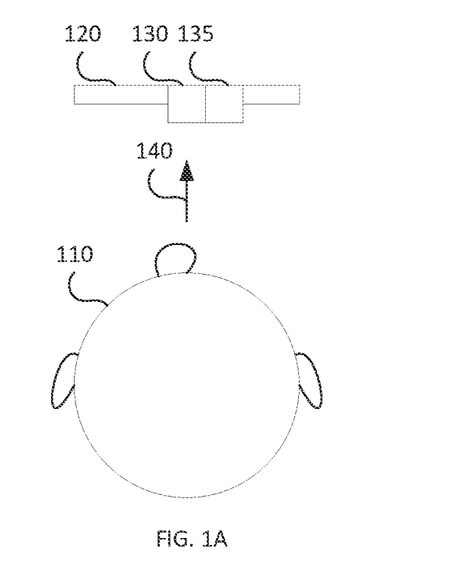
FIGS. 1A, 1B, 1C, and 1D are diagrams of a user's head and lip positions relative to a communication device.
Figure 1B:
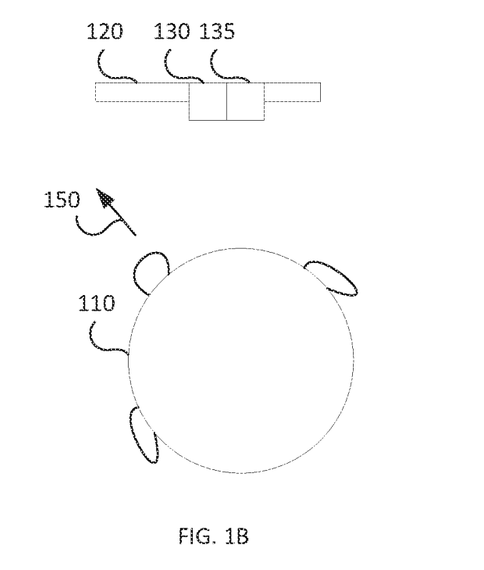
Figure 1C:
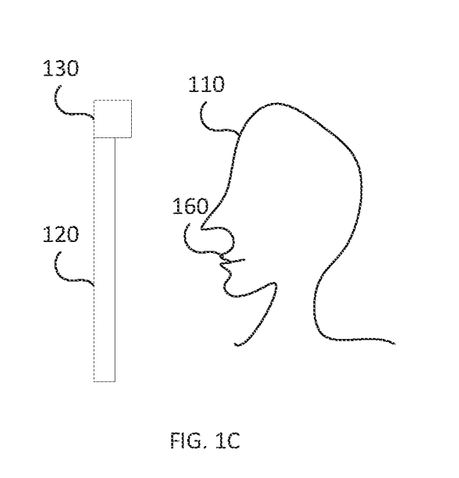
Figure 1D:
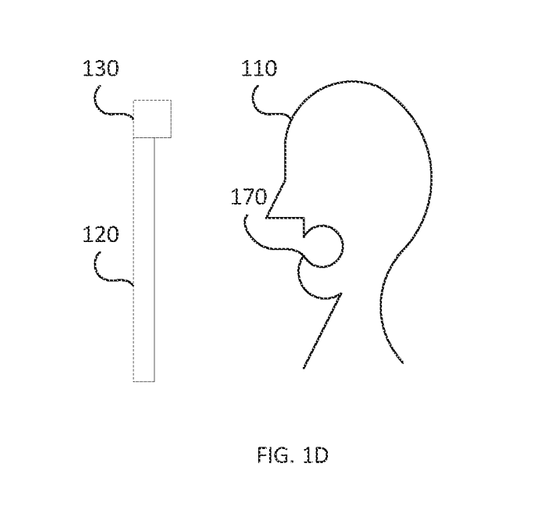

FIGS. 1A-1D represent a variety of head and lip positions relative to a communication device 120. FIG. 1A is a diagram of a user 110 facing directly at an image capture device 130 associated with a communication device 120. In some embodiments, image capture device 130, which may be a camera, may be integrated with the communication device 120. In other embodiments, the image capture device 130 may be a separate external device to communication device 120. The image capture device 130 may include an audio capture device 135, which may be a microphone. In other embodiments, a separate audio capture device 135 may be integrated with the communication device 120 or may be a separate external device to communication device 120. In FIG. 1A, user 110 may be facing in a direction 140 facing at the communication device 120. Direction 140 may be substantially perpendicular to communication device 120 such that user 110 is facing at communication device 120. FIG. 1B is a diagram of the user 110 facing away from communication device 120 in direction 150. While direction 150 is approximately forty-five degrees off perpendicular, any direction not facing substantially directly at the communication device 120 may be referred to herein as facing away from the communication device 120. FIG. 1C is a diagram of a user 110 with closed lips 160. FIG. 1D is a diagram of a user 110 with open lips 170. The communication device 120 may be configured to determine the position of a user's lips using image capture device 130. The communication device 120 may be further configured to detect whether a user 110 is facing at the image capture device 130. Based on a combination of the position of the user's lips and whether the user 110 is facing at the image capture device 130, the communication device 120 may adjust the gain of an audio capture device. In this way, the communication device 120 may mute or unmute the user based upon both the lip position and the orientation of the user's face and head.

Figure 2:
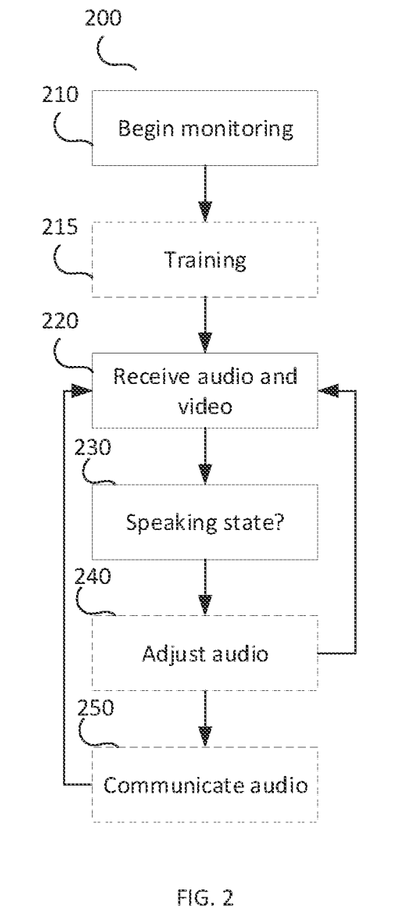
FIG. 2 is a flow diagram of an embodiment of a method for dual sensory input speech detection.

FIG. 2 is a flow diagram of an embodiment of a method 200 for dual sensory input speech detection. At block 210 dual sensory input speech detection system may begin monitoring a user, for example, a participant in a video conference. The dual sensory input speech detection system includes a video capture device (e.g., video capture device 130) and an audio capture device (e.g., audio capture device 135). Optionally, at step 215 the dual sensory input speech detection system may include a training routine to improve identification of characteristics of the user. For example, the user's lip and mouth position as well as the position of the head relative to the image capture device may be observed. The observed lip and mouth characteristics may be used in future decision making by the dual sensory input speech detection system. As another example, the training at block 215 may also include capturing audio of the user speaking by the audio capture device. The captured audio of the user may be used in future decision making by the dual sensory input speech detection system. Training of the dual sensory input speech detection system is described in greater detail in conjunction with FIG. 3. In some cases, training for a specific user may not be accomplished, and a generic user profile may be used by the dual sensory input speech detection system for detecting audio and video characteristics of the user.

At block 220, the dual sensory input speech detection system receives audio input and video images the user. The dual sensory input speech detection system may monitor the position of the user's lips and mouth, the position of the user's head relative to the image capture device, and the audio characteristics in the vicinity of the audio capture device.

At block 230, the dual sensory input speech detection system determines whether the user is in a speaking state. A variety of conditions may lead to a determination that the user is in a speaking state. A speaking state may include the user speaking while facing the video capture device. The user's lips may indicate that the user is talking, and the audio capture device may detect that the user is speaking leading to a determination that the user is in a speaking state. In another example, the user may be speaking and looking away from the video capture device, in this case the user may be considered not in a speaking state. In an embodiment, determining whether the user is in a speaking state may happen at near real time while the user is participating in the video conference. In another embodiment, determining whether the user is in a speaking state may happen periodically or may be triggered based upon changes in the video image and/or audio input.

At block 240, the dual sensory input speech detection system may adjust the audio input based on the received video image and the audio input. Adjusting the audio input may include adjusting the attenuation or gain of the received audio input. Adjusting the audio input may include muting or unmuting of the audio input. The dual sensory input speech detection system may determine to adjust the gain or attenuation (e.g., unmute) of the audio capture device based on whether or not the user is in a speaking state. If the user is facing away from the video capture device, the dual sensory input speech detection system may adjust the audio capture gain downward to mute the user (e.g., the user is likely talking to someone off camera). As yet another example, if the user's audio capture device is unmuted and the dual sensory input speech detection system detects that the user's lips are closed, and the audio capture device detects that the user is not speaking, the dual sensory input speech detection system may determine a condition exists to change the gain of the audio capture device. In this case, the dual sensory input speech detection system may adjust the audio capture gain downward to mute the user. The foregoing examples are meant to be illustrative of several conditions to change the gain of the audio capture device, but not meant to be an exhaustive list. The dual sensory input speech detection system may gradually increase the gain in a linear manner rather than immediately changing the gain from zero to full gain.

At block 250, the audio input may be communication to an audio output common to the video conference. For example, the audio input received at the user device may be transmitted to each of the participants in the video conference. The audio output may be the attenuated audio input, an unaltered audio input or some other version of the received audio input. If a user is muted by the system, no audio output may be provided to the video conference participants.

While the example provided with the description of FIG. 2 are directed to a video conference application, other applications of the dual sensory input speech detection may utilize a similar method for performing tasks associated with other applications. For example, two-factor authentication using images and speech detection, etc. In a video conference application, a participant may be provided with options for interacting with the video conference and the dual sensory input speech detection via a user interface. The participant may be provided with options for refining the functionality of the dual sensory input speech detection system, for example, characteristics of the audio capture and characteristics of the video capture. The participant may also be provided with options for overriding the dual sensory input speech detection system via the user interface.

Figure 3:
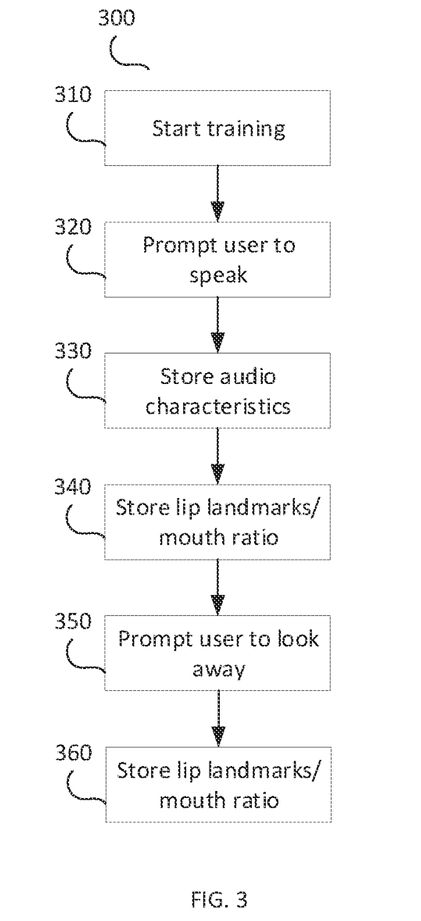
FIG. 3 is a flow diagram of an embodiment of a method for training a dual sensory input speech detection system.

FIG. 3 is a flow diagram of an embodiment of a method 300 for training a dual sensory input speech detection system. At block 310, the dual sensory input speech detection system may enter a training mode. The dual sensory input speech detection system may prompt a user to speak at block 320. The dual sensory input speech detection system may use a display of a communication device (e.g., communication device 120), to provide text for the user to read. The dual sensory input speech detection system may use the audio of the user to train itself. For example, training the dual sensory input speech detection system may be accomplished in one embodiment by storing, comparing, and analyzing audio captured in various training scenarios. Training may enable the dual sensory input speech detection system to differentiate between the user's voice and background noise. Background noise may include any combination of audio sources other than the user's voice, for example lawn mowers, heating, ventilation and air conditioning (HVAC) systems, barking dogs, etc. The dual sensory input speech detection system may also use the audio of the user to train itself to differentiate between the user's voice and other voices. At block 330, the dual sensory input speech detection system may store audio characteristics of the user for use in detecting conditions for changing the gain of the audio capture device.

While the dual sensory input speech detection system is capturing audio characteristics, the dual sensory input speech detection system may also be capturing video characteristics of the user speaking and not speaking. The dual sensory input speech detection system may identify lip landmarks of the user that may be used in identifying when the user is speaking and when the user is not speaking. Fiducial points may be identified surrounding the lips that may be used to identify the position of the lips by the dual sensory input speech detection system. The dual sensory input speech detection system may also determine mouth ratios by comparing a width to height of the mouth in various positions. For example, as the height of the mouth decreases the mouth ratio will increase in value. Thus, a high value of the mouth ratio may indicate that the user is not speaking or has closed their mouth. Lip and mouth characteristics of the user may be stored by the dual sensory input speech detection system at block 340.

At block 350, the dual sensory input speech detection system may prompt the user to look away from the image capture device. The dual sensory input speech detection system may collect lip and mouth characteristics of the user in this alternate position and store those values at block 360.

Figure 4:
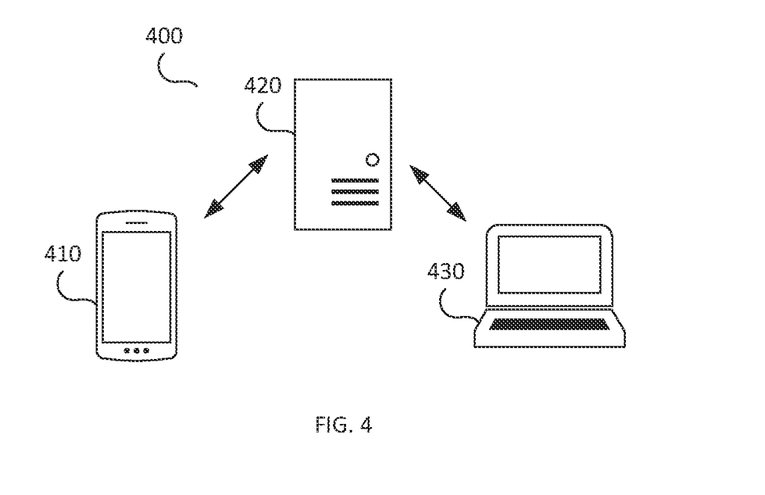
FIG. 4 is diagram of an embodiment of a video conferencing system.

FIG. 4 is diagram of an embodiment of a video conferencing system 400. The video conferencing system 400 includes a first communication device 410, a second communication device 430, and a host device 420. The dual sensory input speech detection system may be implemented locally at the first communication device 410 and the second communication device 430, or remotely at the host device 420, or at some combination of remote and local. Implementing the dual sensory input speech detection system locally at each of the communication devices provides additional privacy and security for the users of the devices. For example, all processing of audio and video may be handled at the communication device of the user and encrypted prior to leaving the user's communication device. In this case, monitoring of the audio and video of the user occurs locally and there is not a need for the host device 420 to evaluate the audio and video of the users. Thus, the video conference may be encrypted locally and the host device 420 handles only encrypted data. In other embodiments, implementing the dual sensory input speech detection system remotely at the host device 420 may reduce the processing load at the communication devices at the expense of privacy of the users. In this case, the video conference would need to be evaluated by the host device 420. This may result in unencrypted transfer of the video conference to the host device 420 where it would be more susceptible to being compromised or intercepted by malevolent third parties.

Figure 5:
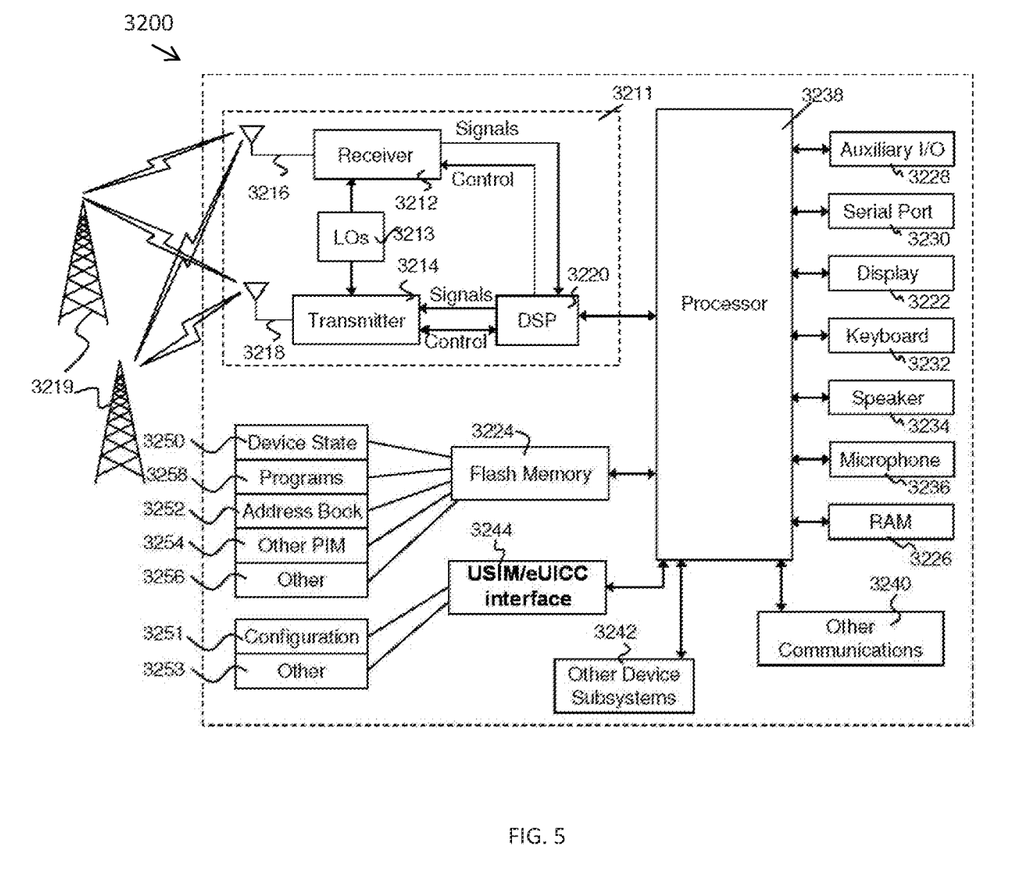
FIG. 5 is a diagram of an embodiment of a communications device.

The various methods or operations described herein may be implemented by a communications device (e.g., user equipment (UE), network nodes, terminal equipment (TE), etc.). An example of a communications device is described below with regard to FIG. 5. The communications device 3200 may comprise a two-way wireless communication device having voice and data communication capabilities. In some embodiments, voice communication capabilities are optional. The communications device 3200 may have the capability to communicate with other computer systems on the Internet. Depending on the exact functionality provided, the communications device 3200 may be referred to as a data messaging device, a two-way pager, a wireless e-mail device, a cellular telephone with data messaging capabilities, a wireless internet appliance, a wireless device, a smart phone, a mobile device, or a data communication device, as examples.

Where the communications device 3200 is enabled for two-way communication, it may incorporate a communication subsystem 3211, including a receiver 3212 and a transmitter 3214, as well as associated components such as one or more antenna elements 3216 and 3218, local oscillators (LOs) 3213, and a processing module such as a digital signal processor (DSP) 3220. The particular design of the communication subsystem 3211 may be dependent upon the communication network 3219 in which the communications device 3200 is intended to operate.

Network access may also vary depending upon the type of communication network 3219. In some networks, network access is associated with a subscriber or user of the communications device 3200. The communications device 3200 may use a universal mobile telecommunications system (USIM) or embedded universal integrated circuit card (eUICC) in order to operate on a network. The USIM/eUICC interface 3244 is typically similar to a card slot into which a USIM/eUICC card may be inserted. The USIM/eUICC card may have memory and may hold many key configurations 3251 and other information 3253, such as identification and subscriber-related information.

When network registration or activation procedures have been completed, the communications device 3200 may send and receive communication signals over the communication network 3219. As illustrated, the communication network 3219 may comprise multiple base stations communicating with the communications device 3200.

Signals received by antenna element 3216 through communication network 3219 are input to receiver 3212, which may perform such common receiver functions such as signal amplification, frequency down conversion, filtering, channel selection, and the like. Analog to digital (A/D) conversion of a received signal allows more complex communication functions, such as demodulation and decoding to be performed in the DSP 3220. In a similar manner, signals to be transmitted are processed, including modulation and encoding for example, by DSP 3220 and are input to transmitter 3214 for digital to analog (D/A) conversion, frequency up conversion, filtering, amplification, and transmission over the communication network 3219 via antenna element 3218. DSP 3220 not only processes communication signals but also provides for receiver and transmitter control. For example, the gains applied to communication signals in receiver 3212 and transmitter 3214 may be adaptively controlled through automatic gain control algorithms implemented in DSP 3220.

The communications device 3200 generally includes a processor 3238 which controls the overall operation of the device. Communication functions, including data and voice communications, are performed through communication subsystem 3211 in cooperation with the processor 3238. Processor 3238 also interacts with further device subsystems such as the display 3222, flash memory 3224, random access memory (RAM) 3226, auxiliary input/output (I/O) subsystems 3228, serial port 3230, one or more user interfaces such as keyboards or keypads 3232, speaker 3234, microphone 3236, one or more other communication subsystems 3240 such as a short-range communications subsystem, and any other device subsystems generally designated as 3242. While the other communication subsystems 3240 and other device subsystems 3242 are depicted as separate components in FIG. 5, it is to be understood that other communication subsystems 3240 and other device subsystems 3242 (or parts thereof) may be integrated as a single component. Serial port 3230 may include a universal serial bus (USB) port or other port currently known or developed in the future.

Some of the illustrated subsystems perform communication-related functions, whereas other subsystems may provide "resident" or on-device functions. Notably, some subsystems, such as keyboard 3232 and display 3222, for example, may be used for both communication-related functions, such as entering a text message for transmission over a communication network, and device-resident functions, such as a calculator or task list.

Operating system software used by the processor 3238 may be stored in a persistent store such as flash memory 3224, which may instead be a read-only memory (ROM) or similar storage element (not shown). The operating system, specific device applications, or parts thereof, may be temporarily loaded into a volatile memory such as RAM 3226. Received communication signals may also be stored in RAM 3226.

As shown, flash memory 3224 may be constituted by different areas for both computer programs 3258 and program data storage 3250, 3252, 3254, and 3256. These different storage types indicate that each program may allocate a portion of flash memory 3224 for their own data storage use. Processor 3238, in addition to its operating system functions, may enable execution of software applications on the communications device 3200. A predetermined set of applications that control basic operations, including at least data and voice communication applications for example, may typically be installed on the communications device 3200 during manufacturing. Other applications may be installed subsequently or dynamically.

Applications and software may be stored on any computer-readable storage medium. The computer-readable storage medium may be tangible or in a transitory/non-transitory medium such as optical (e.g., compact disc (CD), digital versatile disc (DVD), etc.), magnetic (e.g., tape), or other memory currently known or developed in the future.

Software applications may be loaded onto the communications device 3200 through the communication network 3219, an auxiliary I/O subsystem 3228, serial port 3230, other short-range communications subsystem(s) 3240, or any other suitable device subsystem(s) 3242, and installed by a user in the RAM 3226 or a non-volatile store (not shown) for execution by the processor 3238. Such flexibility in application installation may increase the functionality of the communications device 3200 and may provide enhanced on-device functions, communication-related functions, or both. For example, secure communication applications may enable electronic commerce functions and other such financial transactions to be performed using the communications device 3200.

In a data communication mode, a received signal such as a text message or web page download may be processed by the communication subsystem 3211 and input to the processor 3238, which may further process the received signal for output to the display 3222, or alternatively to an auxiliary I/O device 3228.

For voice communications, overall operation of the communications device 3200 is similar, except that received signals may typically be output to a speaker 3234 and signals for transmission may be generated by a microphone 3236. Alternative voice or audio I/O subsystems, such as a voice message recording subsystem, may also be implemented on the communications device 3200. Although voice or audio signal output may be accomplished primarily through the speaker 3234, display 3222 may also be used to provide an indication of the identity of a calling party, the duration of a voice call, or other voice call-related information, for example.

Other device subsystems 3242 may include an image capture device, e.g., camera, for use in video conferencing or other image capture applications. The image capture device may be used in conjunction with the microphone 3236 for a video conference session.

Serial port 3230 may be implemented in a personal digital assistant (PDA)-type device for which synchronization with a user's desktop computer (not shown) may be desirable, but such a port is an optional device component. Such a serial port 3230 may enable a user to set preferences through an external device or software application and may extend the capabilities of the communications device 3200 by providing for information or software downloads to the communications device 3200 other than through a wireless communication network 3219. The alternate download path may, for example, be used to load an encryption key onto the communications device 3200 through a direct and thus reliable and trusted connection to thereby enable secure device communication. Serial port 3230 may further be used to connect the device to a computer to act as a modem.

Other communications subsystems 3240, such as a short-range communications subsystem, are further optional components which may provide for communication between the communications device 3200 and different systems or devices, which need not necessarily be similar devices. For example, one or more other communications subsystems 3240 may include an infrared device and associated circuits and components or a Bluetooth™ communication module to provide for communication with similarly enabled systems and devices. Other communications subsystems 3240 may further include non-cellular communications such as WI-FI, WiMAX, near field communication (NFC), BLUETOOTH, ProSe (Proximity Services) (e.g., sidelink, PC5, D2D, etc.), and/or radio frequency identification (RFID). The other communications subsystem(s) 3240 and/or other device subsystem(s) 3242 may also be used to communicate with auxiliary devices such as tablet displays, keyboards, or projectors.

The communications device 3200 and other components described above might include a processing component that is capable of executing instructions related to the actions described above.

Figure 6:
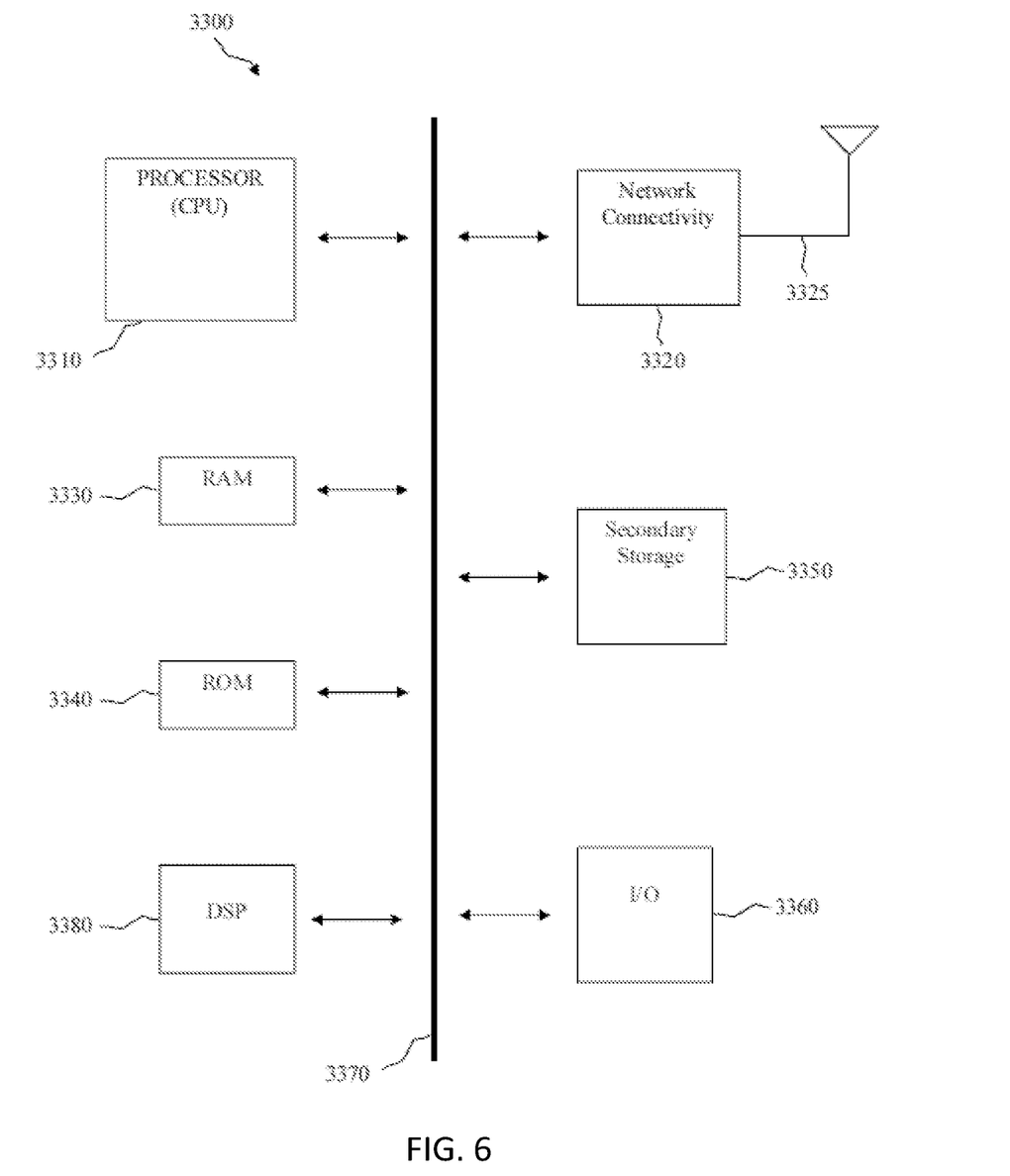
FIG. 6 is a diagram of an embodiment of a system suitable for implementing one or more embodiments disclosed herein.

FIG. 6 illustrates an example of a system 3300 that includes a processing component 3310 suitable for implementing one or more embodiments disclosed herein. In addition to the processor 3310 (which may be referred to as a central processor unit or CPU), the system 3300 might include network connectivity devices 3320, random access memory (RAM) 3330, read only memory (ROM) 3340, secondary storage 3350, and input/output (I/O) devices 3360. These components might communicate with one another via a bus 3370. In some cases, some of these components may not be present or may be combined in various combinations with one another or with other components not shown. These components might be located in a single physical entity or in more than one physical entity. Any actions described herein as being taken by the processor 3310 might be taken by the processor 3310 alone or by the processor 3310 in conjunction with one or more components shown or not shown in the drawing, such as a digital signal processor (DSP) 3380. Although the DSP 3380 is shown as a separate component, the DSP 3380 might be incorporated into the processor 3310.

The processor 3310 executes instructions, codes, computer programs, or scripts that it might access from the network connectivity devices 3320, RAM 3330, ROM 3340, or secondary storage 3350 (which might include various disk-based systems such as hard disk, floppy disk, or optical disk). While only one CPU 3310 is shown, multiple processors may be present. Thus, while instructions may be discussed as being executed by a processor, the instructions may be executed simultaneously, serially, or otherwise by one or multiple processors. The processor 3310 may be implemented as one or more CPU chips.

The network connectivity devices 3320 may take the form of modems, modem banks, ethernet devices, universal serial bus (USB) interface devices, serial interfaces, token ring devices, wireless local area network (WLAN) devices, radio transceiver devices such as code division multiple access (CDMA) devices, Global System for Mobile communication (GSM) radio transceiver devices, universal mobile telecommunications system (UMTS) radio transceiver devices, long term evolution (LTE) radio transceiver devices, new generation radio transceiver devices, worldwide interoperability for microwave access (WiMAX) devices, and/or other well-known devices for connecting to networks. These network connectivity devices 3320 may enable the processor 3310 to communicate with the internet or one or more telecommunications networks or other networks from which the processor 3310 might receive information or to which the processor 3310 might output information. The network connectivity devices 3320 might also include one or more transceiver components 3325 capable of transmitting and/or receiving data wirelessly.

The RAM 3330 might be used to store volatile data and perhaps to store instructions that are executed by the processor 3310. The ROM 3340 is a non-volatile memory device that typically has a smaller memory capacity than the memory capacity of the secondary storage 3350. ROM 3340 might be used to store instructions and perhaps data that are read during execution of the instructions. Access to both RAM 3330 and ROM 3340 is typically faster than to secondary storage 3350. The secondary storage 3350 is typically comprised of one or more disk drives or tape drives and might be used for non-volatile storage of data or as an over-flow data storage device if RAM 3330 is not large enough to hold all working data. Secondary storage 3350 may be used to store programs that are loaded into RAM 3330 when such programs are selected for execution.

The I/O devices 3360 may include liquid crystal displays (LCDs), touch screen displays, keyboards, keypads, switches, dials, mice, track balls, voice recognizers, card readers, paper tape readers, printers, video monitors, audio capture devices, video capture devices, cameras, microphones, or other well-known input/output devices. Also, the transceiver component 3325 might be considered to be a component of the I/O devices 3360 instead of or in addition to being a component of the network connectivity devices 3320.

In a first embodiment, a dual sensory input speech detection method in a video conference is provide. The method comprising receiving, at a first time, a first video image input of a conference participant of the video conference and a first audio input of the conference participant; communicating the first video image input to the video conference; identifying the first video image input as a first facial image of the conference participant; determining, based on the first facial image, the first video image input indicates the conference participant is in a speaking state; identifying the first audio input as a first speech sound; determining, while in the speaking state, the first speech sound originates from the conference participant; and communicating the first audio input to an audio output for the video conference.

A first modification of the first embodiment includes that the audio output is transmitted to other conference participants.

A second modification of the first embodiment includes the first facial image comprises a lip image of the conference participant.

A third modification of the first embodiment includes receiving, at a second time, a second video image input of the conference participant and a second audio input of the conference participant; communicating the second video image input of the conference participant to the video conference; identifying the second video image input as a second facial image of the conference participant; determining, based on the second facial image, the second video image input does not indicate the conference participant is in the speaking state; determining the conference participant is not in the speaking state; and adjusting the second audio input in response to determining that the conference participant is not in the speaking state.

A fourth modification of the first embodiment includes prior to determining the conference participant is not in the speaking state, identifying the second audio input as not a speech sound of the conference participant.

A fifth modification of the first embodiment includes adjusting the second audio input comprises not communicating the second audio input to the audio output of the video conference.

A sixth modification of the first embodiment includes adjusting the second audio input comprises attenuating the second audio input and communicating an attenuated second audio input to the audio output of the video conference.

A seventh modification of the first embodiment includes the method is performed by a dual sensory input speech detection system, and wherein the method further comprises training the dual sensory input speech detection system.

An eighth modification of the first embodiment includes training the dual sensory input speech detection system comprises one or more of identifying lip landmarks of the conference participant, or calculating a mouth ratio of the conference participant.

A ninth modification of the first embodiment includes training the dual sensory input speech detection system further comprises identifying speech characteristics of the conference participant, wherein identifying the first audio input as the first speech sound comprises comparing the first audio input to the speech characteristics of the conference participant, and wherein determining the conference participant is in the speaking state comprises comparing one or more of the lip landmarks or the mouth ratio with the first video image input.

A tenth modification of the first embodiment includes receiving, at the first time, a third video image input of a second conference participant and a third audio input of the second conference participant; communicating the third video image input of the second conference participant to the video conference; identifying the third video image input as a third facial image of the second conference participant; determining, based on the third facial image, the third video image input does not indicate the second conference participant is in the speaking state; determining the second conference participant is not in the speaking state; and adjusting the third audio input in response to determining that the second conference participant is not in the speaking state.

In a second embodiment, a communication device comprises a memory storing instructions; a processor coupled to the memory and configured to execute the instructions to cause the communication device to receive, at a first time, a first video image input of a conference participant of a video conference and a first audio input of the conference participant; communicate the first video image input to the video conference; identify the first video image input as a first facial image of the conference participant; determine, based on the first facial image, the first video image input indicates the conference participant is in a speaking state; identifying the first audio input as a first speech sound; determining, while in the speaking state, the first speech sound originates from the conference participant; and communicating the first audio input to an audio output for the video conference.

A first modification of the second embodiment includes the audio output is transmitted to other conference participants.

A second modification of the second embodiment includes the first facial image comprises a lip image of the conference participant.

A third modification of the second embodiment includes the instructions further cause the communication device to receive, at a second time, a second video image input of the conference participant and a second audio input of the conference participant; communicate the second video image input of the conference participant to the video conference; identify the second video image input as a second facial image of the conference participant; determine, based on the second facial image, the second video image input does not indicate the conference participant is in the speaking state; determine the conference participant is not in the speaking state; and adjust the second audio input in response to determining that the conference participant is not in the speaking state.

A fourth modification of the second embodiment includes the instructions further cause the communication device to identify the second audio input as not a speech sound of the conference participant.

A fifth modification of the second embodiment includes the instructions further cause the communication device to not communicate the second audio input to the audio output of the video conference.

A sixth modification of the second embodiment includes the instructions further cause the communication device to attenuate the second audio input and communicate an attenuated second audio input to the audio output of the video conference.

A seventh modification of the second embodiment includes a dual sensory input speech detection system, and wherein the instructions further cause the communication device to train the dual sensory input speech detection system.

An eighth modification of the second embodiment includes the instructions further cause the communication device to identify lip landmarks of the conference participant, or calculate a mouth ratio of the conference participant.

A ninth modification of the second embodiment includes the instructions further cause the communication device to identify speech characteristics of the conference participant; compare the first audio input to the speech characteristics of the conference participant; and compare one or more of the lip landmarks or the mouth ratio with the first video image input.

While several embodiments have been provided in the present disclosure, it should be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A dual sensory input speech detection method in a video conference, the method comprising:
   receiving, at a first time, a first video image input of a first conference participant of the video conference and a first audio input of the first conference participant, the first conference participant being one of a plurality of video conference participants;
   communicating the first video image input to the video conference;
   identifying the first video image input as a first facial image of the first conference participant;
   determining, based on the first facial image, the first video image input indicates the first conference participant is in a speaking state;
   identifying the first audio input as a first speech sound;
   determining, while in the speaking state, the first speech sound originates from the first conference participant;
   communicating the first audio input to an audio output for the video conference;
   receiving, at a second time after the first time, a second audio input and a second video input from a second conference participant, the second conference participant being one of the plurality of video conference participants;
   communicating the second audio input to the audio output for the video conference;
   receiving, at a third time after the second time, a third video image input of the first conference participant and a third audio input of the first conference participant;
   communicating the third video image input of the first conference participant to the video conference;
   identifying the third video image input as a second facial image of the first conference participant;
   determining, based on the second facial image, the third video image input does not indicate the first conference participant is in the speaking state;
   determining the first conference participant is not in the speaking state; and
   adjusting the third audio input in response to determining that the first conference participant is not in the speaking state.

2. The method of claim 1, wherein the audio output is transmitted to other conference participants.

3. The method of claim 1, wherein the first and second facial images include a lip image of the first conference participant.

4. The method of claim 1, further comprising prior to determining the first conference participant is not in the speaking state, identifying the third audio input as not a speech sound of the first conference participant.

5. The method of claim 1, wherein adjusting the third audio input comprises not communicating the third audio input to the audio output of the video conference.

6. The method of claim 1, wherein adjusting the third audio input comprises attenuating the third audio input and communicating an attenuated audio input to the audio output of the video conference.

7. The method of claim 1, wherein the method is performed by a dual sensory input speech detection system, and wherein the method further comprises training the dual sensory input speech detection system.

8. The method of claim 7, wherein training the dual sensory input speech detection system comprises one or more of identifying lip landmarks of the first conference participant, or calculating a mouth ratio of the first conference participant.

9. The method of claim 8, wherein training the dual sensory input speech detection system further comprises identifying speech characteristics of the first conference participant, wherein identifying the first audio input as the first speech sound comprises comparing the first audio input to the speech characteristics of the first conference participant, and wherein determining the first conference participant is in the speaking state comprises comparing one or more of the lip landmarks or the mouth ratio with the first video image input.

10. The method of claim 1 further comprising:
   receiving, at a fourth time, a fourth video image input of the second conference participant and a fourth audio input of the second conference participant;
   communicating the fourth video image input of the second conference participant to the video conference;
   identifying the fourth video image input as a fourth facial image of the second conference participant;
   determining, based on the fourth facial image, the fourth video image input does not indicate the second conference participant is in the speaking state;
   determining the second conference participant is not in the speaking state; and
   adjusting the fourth audio input in response to determining that the second conference participant is not in the speaking state.

11. A communication device comprising:
   a memory storing instructions;
   a processor coupled to the memory and configured to execute the instructions to cause the communication device to:
      receive, at a first time, a first video image input of a first conference participant of a video conference and a first audio input of the first conference participant, the first conference participant being one of a plurality of video conference participants;
      communicate the first video image input to the video conference;
      identify the first video image input as a first facial image of the first conference participant;
      determine, based on the first facial image, the first video image input indicates the first conference participant is in a speaking state;
      identifying the first audio input as a first speech sound;
      determining, while in the speaking state, the first speech sound originates from the first conference participant;
      communicating the first audio input to an audio output for the video conference;
      receiving, at a second time after the first time, a second audio input and a second video input from a second conference participant, the second conference participant being one of the plurality of video conference participants;
      communicating the second audio input to the audio output for the video conference;
      receive, at a third time after the second time, a third video image input of the first conference participant and a third audio input of the first conference participant;

communicate the third video image input of the first conference participant to the video conference;

identify the third video image input as a second facial image of the first conference participant;

determine, based on the second facial image, the third video image input does not indicate the first conference participant is in the speaking state;

determine the first conference participant is not in the speaking state; and adjust the third audio input in response to determining that the first conference participant is not in the speaking state.

12. The communication device of claim 11, wherein the audio output is transmitted to other conference participants.

13. The communication device of claim 11, wherein the first facial image comprises a lip image of the first conference participant.

14. The communication device of claim 11, wherein the instructions further cause the communication device to identify the third audio input as not a speech sound of the first conference participant.

15. The communication device of claim 11, wherein the instructions further cause the communication device to not communicate the third audio input to the audio output of the video conference.

16. The communication device of claim 11, wherein the instructions further cause the communication device to attenuate the third audio input and communicate an attenuated audio input to the audio output of the video conference.

17. The communication device of claim 11, further comprising a dual sensory input speech detection system, and wherein the instructions further cause the communication device to train the dual sensory input speech detection system.

18. The communication device of claim 17, wherein the instructions further cause the communication device to identify lip landmarks of the first conference participant, or calculate a mouth ratio of the first conference participant.

19. The communication device of claim 18, wherein the instructions further cause the communication device to:

identify speech characteristics of the first conference participant;

compare the first audio input to the speech characteristics of the first conference participant; and compare one or more of the lip landmarks or the mouth ratio with the first video image input.

* * * * *